United States Patent Office 3,043,628
Patented July 10, 1962

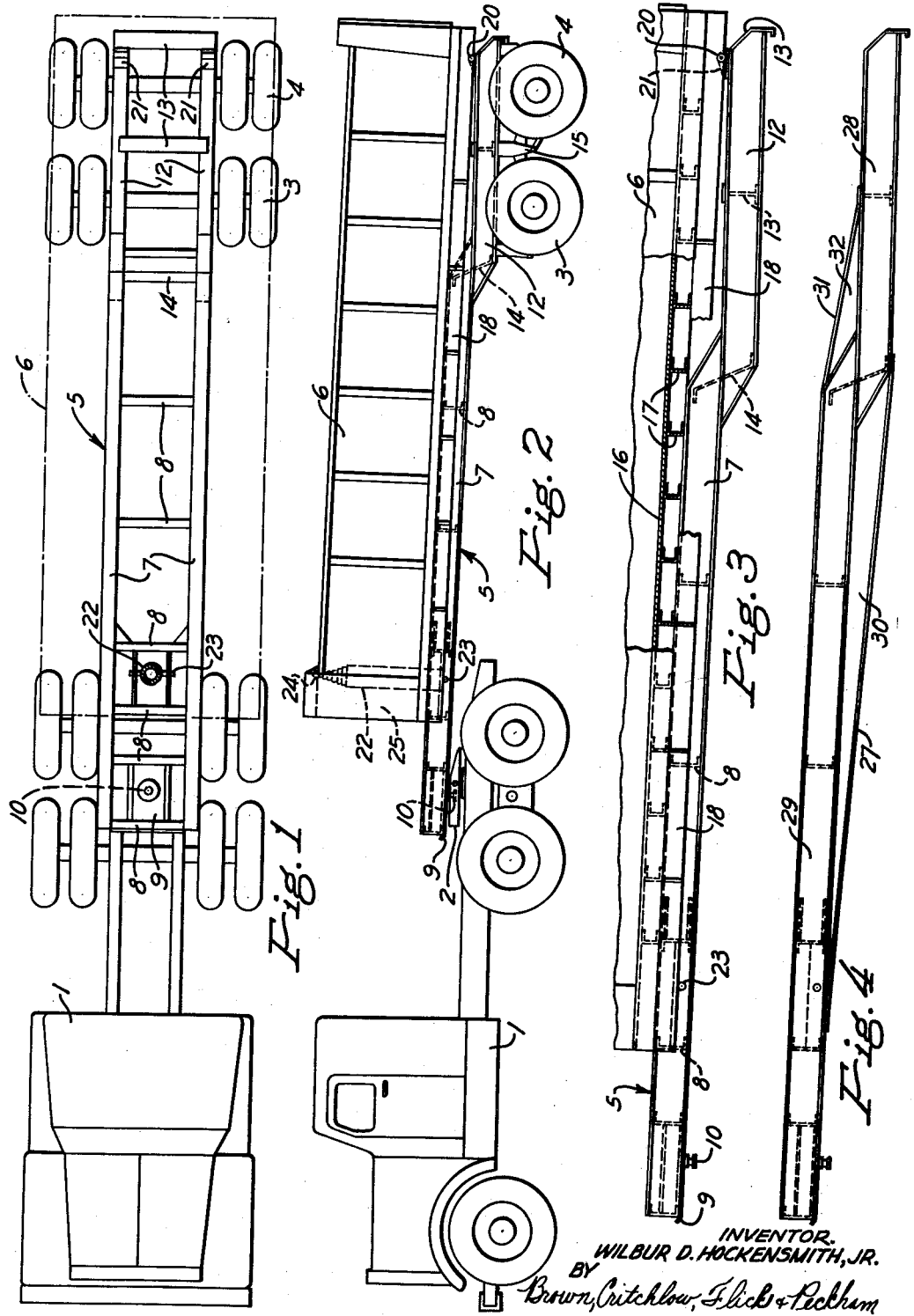

3,043,628
SEMI-TRAILER FRAME AND CHASSIS
Wilbur D. Hockensmith, Jr., 628 Cedar St., Irwin, Pa.
Filed June 23, 1960, Ser. No. 38,235
6 Claims. (Cl. 298—20)

This invention relates to semi-trailers, and more particularly to their chassis.

Semi-trailers have wheels at their rear ends, but their front ends are supported by the truck tractors that haul them. The front end of such a trailer is provided with a king pin that projects down into a fifth wheel mounted on the rear end of a tractor. In most cases the fifth wheel is mounted as low as possible in view of the clearances that are necessary. It is common practice to slope the trailer frame downward from the fifth wheel to the rear wheels so that the top of the rear end of the trailer frame will be from four to five inches lower than the connection between the trailer and the tractor. There are several reasons for this. If the frame is horizontal from end to end while being hauled, its center of gravity is too high so that the trailer sways too easily on its springs as it goes around curves. Also, a horizontal frame would require excess metal and weight at the rear to build it up to the desired level. If a dumping body is used on the frame, it is desirable that it slope to the rear for drainage purposes, because dump trailers usually are parked outside.

However, when tandem axles are used in a trailer and its chassis is tilted up to connect it to a tractor, the trailer frame tends to lift the front tandem axle and relieve some of the pressure on its wheels. At the same time, the pressure is increased on the wheels behind. This produces an undesirable condition. It has been proposed to solve the problem by putting a spacer between the bottom of the trailer frame and the top of the front axle mounting to lower the axle, but that causes the suspension for the tandem wheels to operate at a disadvantage and not in accordance with the way it was designed.

It is among the objects of this invention to provide a semi-trailer chassis, which is designed to support a rearwardly sloping body, which will permit its tandem axles to be loaded substantially equally, and which will not interfere with proper operation of the suspension for the tandem wheels.

In accordance with this invention, a semi-trailer chassis has a frame supported at its rear end by tandem wheels. The front end of the frame is provided with a king pin for connection to a tractor. The frame has a short horizontal portion over the wheels and a long inclined portion sloping from the front end of the horizontal portion up to the king pin. A sloping body mounted on the inclined portion of the frame can be hinged to the rear end of the frame so that the front end of the body can be raised for dumping purposes.

The invention is illustrated in the accompanying drawings, in which

FIG. 1 is a plan view of my semi-trailer chassis attached to a tractor;

FIG. 2 is a side view showing a dumping body mounted on the trailer chassis;

FIG. 3 is an enlarged fragmentary side view of the body and frame, with part of the body broken away; and FIG. 4 is a side view of a modified frame.

Referring to FIGS. 1 and 2 of the drawings, a truck tractor 1 of any conventional design has the usual fifth wheel 2 mounted on its rear end. The fifth wheel is detachably connected to the front end of a semi-trailer in a well known manner so that the tractor can pull the trailer. The trailer consists of at least two sets of tandem wheels 3 and 4 supporting the rear end of a frame 5 that supports a trailer body 6. The major portion of the frame is formed from a pair of parallel inclined side beams 7 that are rigidly connected at longitudinally spaced points by cross braces 8. Mounted between the front two braces is a plate 9, from which a king pin 10 projects down into the fifth wheel. By welding plate 9 in between the lower flanges of the beams instead of having it overlap their lower surfaces, material and some weight are saved.

The side beams 7 slope toward the rear of the trailer and their rear ends overlap the front ends of a pair of parallel horizontal beams 12, to which they are rigidly secured, such as by welding. The horizontal beams are much shorter than the inclined beams, being no more than half as long, and are rigidly connected by cross braces 13. At the junction of the inclined and horizontal beams the frame can be reinforced by a wide Z bar 14. The length of the horizontal beams does not need to be much more than enough to extend across the tandem wheel unit and only great enough to accommodate the suspension unit 15. The slope of the inclined beams is such that the top of the rear end of the frame is the desired distance above the ground.

The major portion of the trailer body 6 is seated on the inclined beams 7 of the chassis and, as shown in FIG. 3, may include a floor 16 supported by parallel cross members 17 that in turn are supported by parallel stringers 18, which extend the length of the body. The stringers straddle the trailer frame and their lower rear corners are about at the level of the top of horizontal beams 12. Consequently, the body has the desired slope and yet the portion of frame 5 that is above the trailer wheels is horizontal so that the axle for the front wheels 3 is not relieved of any of the load. In other words, all of the wheels are substantially equally loaded and suspension 15 will perform at its best.

If body 6 is a dump body, its rear end can be pivoted to the rear end of frame 5 by a hinge pin 20 projecting from brackets 21 mounted on the rear ends of horizontal beams 12. The telescoping lifting cylinders 22 for the body are pivotally connected to the front portion of the trailer frame on a cross pin 23, and to the front of the body by means of a pin 24 mounted in the upper end of an inverted pocket 25 that receives the cylinders in a well known manner.

The trailer just described has all of the advantages of one with a sloping frame, and yet the load remains uniformly distributed on the tandem axles while the trailer is traveling over the road. The horizontal rear portion of the frame equalizes the weight better on the axles than a sloping frame. With my trailer frame it is unnecessary to start with large beams and then reduce the depth of their front ends by cutting and welding to prevent the frame from sloping too steeply, as has often been the practice heretofore, which often resulted in warping the beams due to the welding heat. On the contrary, the frame at the front end can be made deeper than usual for added strength, without distributing the load unequally on the tandem wheels 3 and 4.

In FIG. 4 the frame is shown reinforced by a truss bar 27 underneath, extending from the front end of the horizontal beam 28 to a point near the front end of the inclined beam 29. The space between the bar and the bottom of the inclined beam is filled by a web 30, and all of these members are welded together. Additional strength can be obtained by using a similar truss bar 31 and web 32 on top of the horizontal beam, with the front end of the bar welded to the rear end of the inclined beam, and the rear end of the bar secured to the central portion of the horizontal beam.

Although only two sets of tandem wheels are shown, it will be understood that this invention is equally applicable to a trailer having more than two tandem axles.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A semi-trailer frame for a rearwardly sloping body, comprising a pair of short parallel horizontal beams adapted to be supported by tandem wheels at the back of the frame, a pair of long parallel inclined beams extending forward and upward from the horizontal beams to the front of the frame, the inclined beams having their rear ends overlapping the front ends of the horizontal beams and rigidly secured thereto, cross members rigidly connecting the beams at one side of the frame to those at the opposite side, and a king pin projecting downward from the front end of the frame.

2. A semi-trailer frame for a rearwardly sloping body, comprising a pair of short parallel horizontal beams adapted to be supported by tandem wheels at the back of the frame, a pair of long parallel inclined beams extending forward and upward from the horizontal beams to the front of the frame, the inclined beams having their rear ends overlapping the front ends of the horizontal beams and rigidly secured thereto, a reinforcing member secured to the front end of each horizontal beam and extending forward therefrom along the bottom of the adjoining inclined beam and secured thereto, cross members rigidly connecting the beams at one side of the frame to those at the opposite side, and a king pin projecting downward from the front end of the frame.

3. A semi-trailer frame for a rearwardly sloping body, comprising a pair of short parallel horizontal beams adapted to be supported by tandem wheels at the back of the frame, a pair of long parallel inclined beams extending forward and upward from the horizontal beams to the front of the frame, the inclined beams having their rear ends overlapping the front ends of the horizontal beams and rigidly secured thereto, a reinforcing member secured to the rear end of each inclined beam and extending rearwardly therefrom along the top of the adjoining horizontal beam and secured thereto, a reinforcing member secured to the front end of each horizontal beam and extending forward therefrom along the bottom of the adjoining inclined beam and secured thereto, cross members rigidly connecting the beams at one side of the frame to those at the opposite side, and a king pin projecting downward from the front end of the frame.

4. A semi-trailer chassis for a rearwardly sloping body, comprising a set of tandem wheel axles at the back of the chassis, a pair of short parallel horizontal beams extending across said axles, means mounted on the axles supporting said beams, a pair of long parallel inclined beams extending forward and upward from the horizontal beams to the front of the chassis, the inclined beams having their rear ends overlapping the front ends of the horizontal beams and rigidly secured thereto close to the front tandem axle, cross members rigidly connecting the beams at one side of the chassis to those at the opposite side, and a king pin projecting downward from the front end of the chassis.

5. A semi-trailer frame for a rearwardly sloping body, comprising a pair of short parallel horizontal beams adapted to be supported by tandem wheels at the back of the frame, a pair of long parallel inclined beams extending forward and upward from the horizontal beams to the front of the frame, the inclined beams having their rear ends overlapping the front ends of the horizontal beams and rigidly secured thereto, the inclined beams having the same thickness as the horizontal beams, cross members rigidly connecting the beams at one side of the frame to those at the opposite side, and a king pin projecting downward from the front end of the frame.

6. A semi-trailer comprising a pair of short parallel horizontal beams extending lengthwise of the trailer, tandem wheel axles supporting said beams, a pair of long parallel inclined beams extending forward and upward from the horizontal beams to the front end of the trailer, the inclined beams having their rear ends overlapping the front ends of the horizontal beams and rigidly secured thereto close to the front tandem axle, all of said beams having substantially the same thickness throughout their lengths, cross members rigidly connecting the beams at one side of the trailer to those at the opposite side, a king pin projecting downward from the front end of the trailer, a rearwardly sloping dumping body normally resting flat on said inclined beams and extending rearwardly along said horizontal beams, and means pivotally connecting the rear end of the body with the rear ends of the horizontal beams on a transverse axis.

References Cited in the file of this patent

UNITED STATES PATENTS

| | | |
|---|---|---|
| 1,613,345 | Culver | Jan. 4, 1927 |
| 1,954,637 | Linn | Apr. 10, 1934 |
| 2,446,205 | Wickersham | Aug. 3, 1948 |
| 2,605,113 | Gilmore | July 24, 1952 |
| 2,661,236 | Schonrock | Dec. 1, 1953 |
| 2,662,780 | Talbert | Dec. 15, 1953 |